United States Patent
Tamatani et al.

(10) Patent No.: US 9,075,256 B2
(45) Date of Patent: Jul. 7, 2015

(54) METHOD OF MANUFACTURING LIQUID CRYSTAL DISPLAY DEVICE, AND SYSTEM OF MANUFACTURING LIQUID CRYSTAL DISPLAY DEVICE

(71) Applicant: MITSUBISHI ELECTRIC CORPORATION, Tokyo (JP)

(72) Inventors: Akira Tamatani, Kumamoto (JP); Takashi Taguchi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 68 days.

(21) Appl. No.: 14/064,063

(22) Filed: Oct. 25, 2013

(65) Prior Publication Data

US 2014/0140366 A1   May 22, 2014

(30) Foreign Application Priority Data

Nov. 22, 2012 (JP) ................. 2012-256267

(51) Int. Cl.
*G02F 1/1339* (2006.01)
*G02F 1/1333* (2006.01)

(52) U.S. Cl.
CPC .................... *G02F 1/1333* (2013.01)

(58) Field of Classification Search
CPC ............ G02F 1/13394; G02F 1/13392; G02F 1/133512; G02F 1/1339; G02F 1/134363; G02F 1/1341; G02F 1/1345; G02F 2001/13415; G02F 1/133377; G02F 1/133345
USPC .................................... 349/155, 153, 190, 84
See application file for complete search history.

(56) References Cited

U.S. PATENT DOCUMENTS

| | | | |
|---|---|---|---|
| 6,377,328 B1 * | 4/2002 | Morimoto et al. | 349/155 |
| 2005/0012889 A1 * | 1/2005 | Ishii et al. | 349/156 |
| 2006/0274220 A1 * | 12/2006 | Kim | 349/56 |
| 2006/0280878 A1 | 12/2006 | Suezaki et al. | |

FOREIGN PATENT DOCUMENTS

| | | | | |
|---|---|---|---|---|
| JP | 2005-258422 A | | 9/2005 | |
| JP | 2008-065077 A | | 3/2008 | |
| JP | 2008065077 A | * | 3/2008 | ............ G02F 1/1339 |

* cited by examiner

*Primary Examiner* — Mike Qi
(74) *Attorney, Agent, or Firm* — Studebaker & Brackett PC

(57) ABSTRACT

A method includes the steps of: (a) measuring a height of a pillar spacer after the pillar spacer is formed on a main surface of a CF substrate; (b) measuring a gap between a TFT substrate and the CF substrate after the TFT substrate and the CF substrate are bonded to each other; and (c) determining a quality of a liquid crystal panel based on the difference between the measured height of the pillar spacer and the measured gap.

11 Claims, 9 Drawing Sheets

METHOD OF MANUFACTURING LIQUID CRYSTAL DISPLAY DEVICE, AND SYSTEM OF MANUFACTURING LIQUID CRYSTAL DISPLAY DEVICE

BACKGROUND OF THE INVENTION

1. Field of the Invention

The present invention relates to a method of manufacturing a liquid crystal display device, and particularly, to a method of manufacturing a liquid crystal display device configured to hold a gap between substrates by a pillar spacer.

2. Description of the Background Art

In a general liquid crystal display device, a gap between a pair of opposing substrates is held constant by a spacer, and liquid crystal is filled between the substrates. Source lines and gate lines are arranged to cross each other in a matrix on one substrate, and a thin-film transistor is arranged on its intersection. Thus, this substrate is formed as an active matrix substrate (TFT substrate).

The other substrate is a filter substrate on which color filters (CF) are arranged, wherein a pixel portion is defined by a black matrix (hereinafter referred to as BM), and color filters of R (red), G (green), and B (blue) are formed on the pixel portion.

A transmissive or semi-transmissive liquid crystal display device includes a light source device such as a backlight. Here, the description of the light source device is skipped.

Examples of the spacer holding the gap between the substrates include particulate spacer beads, each having a diameter of about a few micrometers, and a pillar spacer provided by forming a pillar projection on a substrate.

However, spacer beads are randomly scattered on the substrate, so that they might be arranged even on a pixel portion. In this case, a light leakage is caused due to a disturbance in the alignment of the liquid crystal around the spacer beads, which entails a problem of deteriorating an image quality, such as a problem of reducing an image contrast. This is described in Japanese Patent Application Laid-Open No. 2005-258422.

In view of this, a liquid crystal display device requiring a satisfactory display quality tends to use a pillar spacer.

However, when the temperature of the liquid crystal display device using the pillar spacer increases, the elastic deformation of the pillar spacer cannot keep up with the thermal expansion of the liquid crystal, so that the liquid crystal stays on the lower side of the panel by a gravity force. This causes a gap unevenness (gravity unevenness, high-temperature gap unevenness, high-temperature swelling toward the bottom) in which the gap on the lower side of the panel increases. At low temperature, the elastic deformation of the pillar spacer cannot keep up with the thermal contraction of the liquid crystal, so that an internal pressure of the liquid crystal rapidly decreases to cause a low-temperature bubbling phenomenon in which air bubbles are generated, as described in Japanese Patent Application Laid-Open No. 2008-65077, for example.

For these problems, the above-mentioned Japanese Patent Application Laid-Open Nos. 2005-258422 and 2008-65077 describe a technique in which, as an initial design value, an elastic deformation ratio of a pillar spacer is specified and a height of the pillar spacer is measured, and an optimum amount of liquid crystal is determined according to the initial design value, and a technique of using a pillar spacer whose deformation range is large in order to increase a margin for the high-temperature gap unevenness and the low-temperature bubbling phenomenon. However, the variation in the height of the pillar spacer during the manufacture and the variation in the actual amount of the liquid crystal have to be considered. Therefore, a margin sufficient for covering the variation cannot actually be secured.

The defect such as the low-temperature bubbling phenomenon and high-temperature gap unevenness described above occurs during the use of the product after the shipment. These problems are involved with reliability of the product, and have to be eradicated.

Therefore, during a mass-production of actual products, a high-temperature test and low-temperature test are carried out for all of the actually manufactured liquid crystal display devices, as a finishing control, for confirming whether or not the high-temperature gap unevenness and low-temperature bubbling phenomenon occurs.

This leads to a long work period, and troublesome work, which increases cost. The use of the pillar spacer having large elastic deformation range for increasing the margin as described above might increase cost due to the development of the pillar spacer and increase in material cost. Since the elastic deformation is easy with the general substrate gap, the gap between the substrates cannot stably be held, resulting in that a new problem of an occurrence of non-uniform display caused by vibration might arise.

SUMMARY OF THE INVENTION

The present invention aims to provide a method of manufacturing a liquid crystal display device, which uses a pillar spacer to hold a gap between substrates, and a system of manufacturing the liquid crystal display device, the method and system preventing an occurrence of high-temperature gap unevenness and low-temperature bubbling phenomenon.

A method of manufacturing a liquid crystal display device according to the present invention is a method of manufacturing a liquid crystal display device provided with a liquid crystal panel displaying a video image, the liquid crystal panel including: first and second substrates arranged to be opposite to each other; a pillar spacer arranged on a main surface of the first substrate opposite to the second substrate, the pillar spacer holding a gap between the first substrate and the second substrate; and liquid crystal held between the first and second substrates, a manufacturing method of said liquid crystal panel including the steps of: (a) measuring a height of the pillar spacer after the pillar spacer is formed on the main surface of the first substrate; (b) measuring the gap between the first and second substrates after the first and second substrates are bonded to each other; and (c) determining a quality of the liquid crystal panel based on the difference between the measured height of the pillar spacer and the measured gap in the manufacture of the liquid crystal panel.

According to the method of manufacturing the liquid crystal display device described above, the quality of the liquid crystal panel is determined based on the difference between the measured height of the spacer and the measured gap. Accordingly, the liquid crystal display device free from the high-temperature gap unevenness and low-temperature bubbling phenomenon can be manufactured with high yield, and the liquid crystal display device having satisfactory display characteristic and excellent reliability can be obtained.

It becomes unnecessary to confirm whether or not the high-temperature gap unevenness and low-temperature bubbling phenomenon occur as a result of high-temperature and low-temperature tests to all of the actually manufactured liquid crystal display devices. Accordingly, the work period for the manufacture can be shortened, and cost can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

<Introduction>

Before preferred embodiments are described, why high-temperature gap unevenness and low-temperature bubbling phenomenon occur will be described with reference to FIGS. 9 to 17.

<Case of Pillar Spacers with Same Height>

Figure 9:
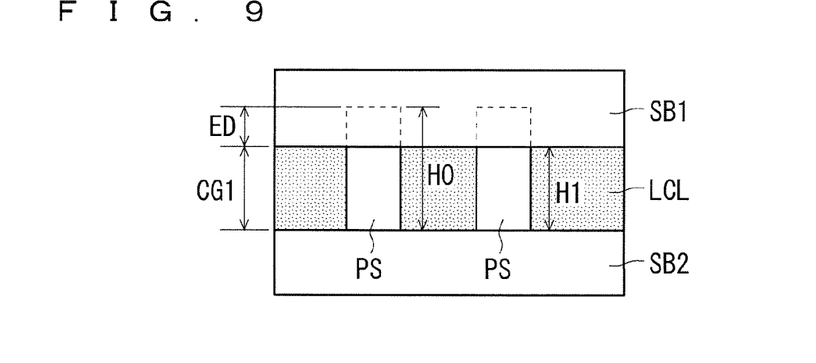
FIGS. 9 to 11 are views describing why the high-temperature gap unevenness and low-temperature bubbling phenomenon occurs in a liquid crystal display device having pillar spacers with the same height.

The case where pillar spacers have the same height will be described with reference to FIGS. 9 to 11. FIG. 9 is a cross-sectional view illustrating a state of a liquid crystal display device at room temperature after liquid crystal is injected therein. A liquid crystal layer LCL is held between a substrate SB1 and a substrate SB2.

The liquid crystal is injected by an one drop fill (ODF) process as described below. Specifically, a seal material for bonding is formed on two substrates on which an alignment film is formed and an alignment process such as rubbing is performed, and then, liquid crystal is dropped in a necessary amount. Thereafter, two substrates are bonded to each other in a vacuum. A space defined by two substrates, arranged to be opposite to each other, and the seal material is referred to as a "cell", and the space between the substrates is referred to as a "cell gap".

A pillar spacer PS with an initial height H0 is arranged between the substrate SB1 and the substrate SB2. As illustrated in FIG. 9, the pillar spacer PS is arranged as preliminarily being compressed during the manufacture of the cell in order to keep up with the change in the gap caused by the thermal expansion of the liquid crystal. The height of the pillar spacer PS at room temperature is H1 after the cell is manufactured. FIG. 9 illustrates an elastic deformation amount of the pillar spacer PS by the compression as ED, and the cell gap at room temperature as CG1.

Figure 10:
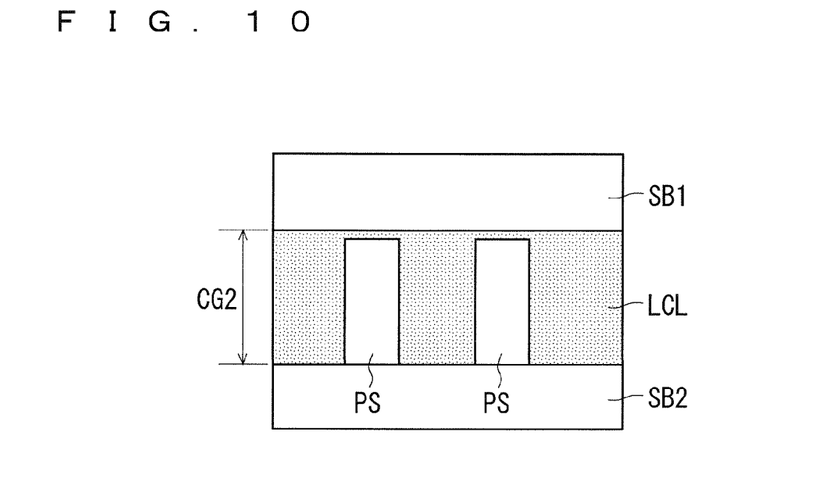

FIG. 10 illustrates the state in which the liquid crystal layer LCL expands with the temperature rise of the liquid crystal display device. When the cell gap increases to become a cell gap CG2 wider than the initial height H0 of the pillar spacer PS, the elastic deformation of the pillar spacer PS cannot keep up with the increase in the cell gap. Therefore, a gap is formed between the leading end of the pillar spacer PS and the substrate SB1. In this case, the gap between the substrates cannot be held by the pillar spacer PS. As a result, the liquid crystal in the volume that cannot be held by the pillar spacer PS stays on the lower side of the panel by gravity force, which locally increases the gap on the lower side of the panel. This causes a high-temperature gap unevenness.

Figure 11:
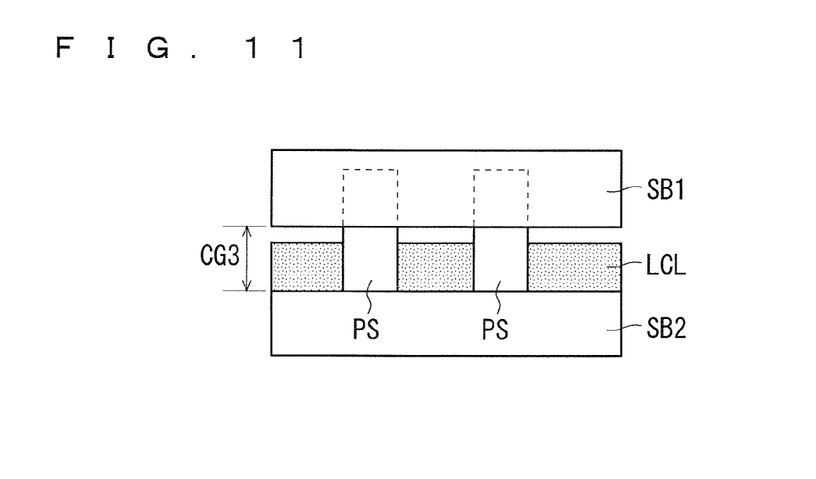

FIG. 11 illustrates the state in which the liquid crystal layer LCL is contracted with the temperature drop of the liquid crystal display device. When the cell gap narrows due to the contraction of the liquid crystal layer LCL, the pillar spacer PS is elastically deformed. Therefore, the height of the pillar spacer PS lowers according to the space of the contracted cell gap CG3. However, when repelling force of the pillar spacer PS becomes equal to atmospheric pressure, the pillar spacer PS is not deformed any more.

On the other hand, when the liquid crystal layer LCL is further contracted, a pressure in the cell of the liquid crystal display device decreases, so that vacuum bubble (low-temperature bubbling) is generated in the cell.

<Case of Pillar Spacers with Different Height>

The case where two types of pillar spacers each having a different height are used will be described with reference to FIGS. 12 to 14.

Figure 12:
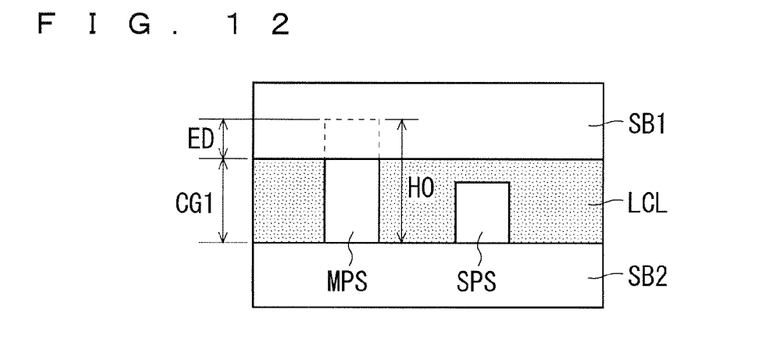
FIGS. 12 to 14 are views for describing why the high-temperature gap unevenness and low-temperature bubbling phenomenon occur in a liquid crystal display device having two types of pillar spacers, each having a different height.

FIG. 12 is a cross-sectional view illustrating a state of a liquid crystal display device at room temperature after liquid crystal is injected therein. A main pillar spacer MPS and a sub pillar spacer SPS are arranged between a substrate SB1 and a substrate SB2. The initial height of the main pillar spacer MPS is larger than the initial height of the sub pillar spacer SPS. The main pillar spacer MPS is arranged as being preliminarily compressed during the manufacture of the cell in order to keep up with the change in the gap caused by the thermal expansion of the liquid crystal. As illustrated in FIG. 12, only the main pillar spacer MPS is elastically deformed. FIG. 12 illustrates an elastic deformation amount of the main pillar spacer MPS by the compression as ED, and the cell gap at room temperature as CG1.

Figure 13:
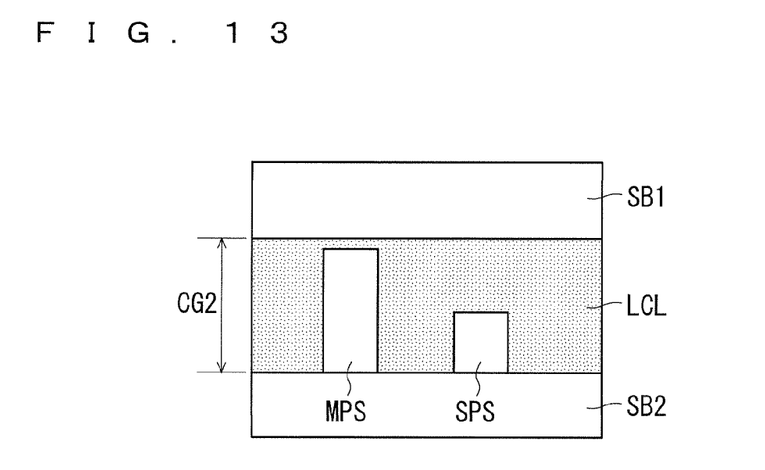

FIG. 13 illustrates the state in which the liquid crystal layer LCL expands with the temperature rise of the liquid crystal display device. When the cell gap increases to become a cell gap CG2 wider than the initial height H0 of the main pillar spacer MPS, the elastic deformation of the main pillar spacer MPS cannot keep up with the increase in the cell gap. Therefore, a gap is formed between the leading end of the main pillar spacer MPS and the substrate SB1. As a result, the liquid crystal stays on the lower side of the panel by a gravity force, which further increases the gap on the lower side of the panel. This causes a high-temperature gap unevenness.

Figure 14:
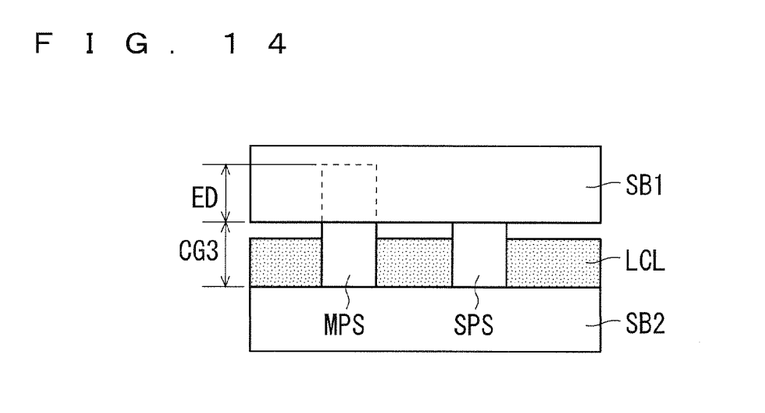

FIG. 14 illustrates the state in which the liquid crystal layer LCL is contracted with the temperature drop of the liquid crystal display device. When the cell gap narrows due to the contraction of the liquid crystal layer LCL, the main pillar spacer MPS is firstly elastically deformed. Therefore, the height of the main pillar spacer MPS lowers according to the space of the contracted cell gap CG3. When the sub pillar spacer SPS is then brought into contact with the substrate SB1, a repelling force to the substrate SB1 increases. When the repelling force of the main pillar spacer MPS and the sub pillar spacer SPS becomes equal to atmospheric pressure, they are not deformed any more.

On the other hand, when the liquid crystal layer LCL is further contracted, the pressure in the cell of the liquid crystal display device decreases, so that vacuum bubble (low-temperature bubbling) is generated in the cell.

Since the sub pillar spacers SPS in the number larger than the number of the main pillar spacer MPS are arranged, or since the occupied area of the sub pillar spacer SPS is larger than that of the main pillar spacer MPS, the repelling force becomes stronger than in the case of using only the main pillar spacer MPS. Therefore, the time when the repelling force becomes equal to atmospheric pressure comes earlier.

<Case of Forming Protrusion on Counter Substrate>

Figure 15:
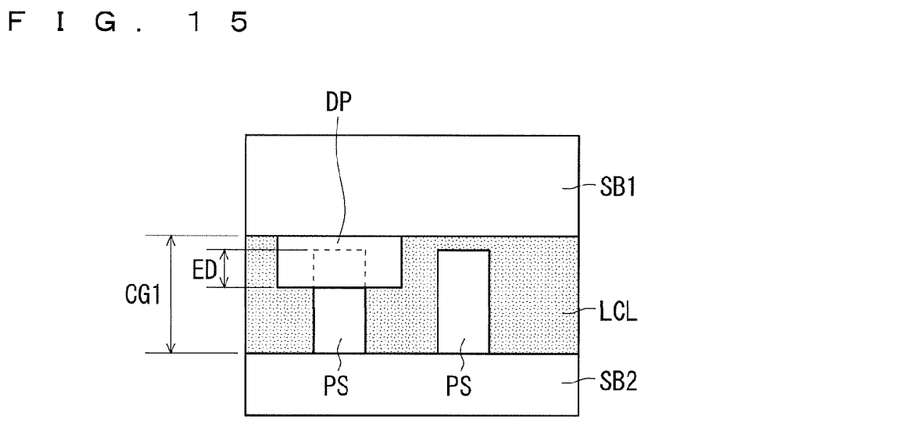
FIGS. 15 to 17 are views for describing why the high-temperature gap unevenness and low-temperature bubbling phenomenon occur in a liquid crystal display device having a protrusion.

The case where a protrusion is formed on a counter substrate will be described with reference to FIGS. 15 to 17. FIG. 15 is a cross-sectional view illustrating a state of a liquid crystal display device at room temperature after liquid crystal is injected. A protrusion DP is formed on the substrate SB1 serving as a counter substrate, and the pillar spacer PS is in contact with the protrusion DP. As illustrated in FIG. 15, one of the pillar spacers PS is in contact with the protrusion DP as being preliminarily compressed during the manufacture of the cell in order to keep up with the change in the gap caused by the thermal expansion of the liquid crystal. FIG. 15 illustrates an elastic deformation amount of the pillar spacer PS by the compression as ED, and the cell gap at room temperature as CG1.

Figure 16:
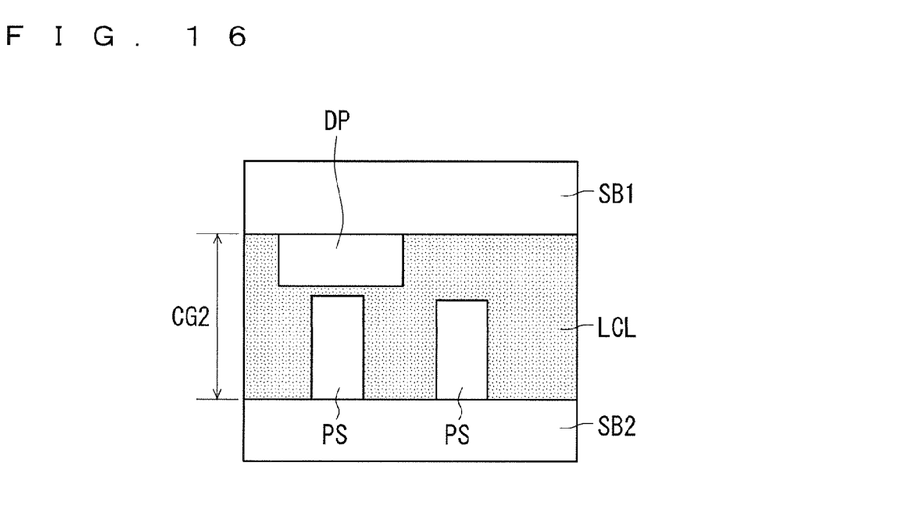

FIG. 16 illustrates the state in which the liquid crystal layer LCL expands with the temperature rise of the liquid crystal display device. When the cell gap increases to become a cell gap CG2 wider than the total of the initial height of the pillar spacer PS and the protrusion DP, the elastic deformation of the pillar spacer PS cannot keep up with the increase in the cell gap. Therefore, a gap is formed between the leading end of the pillar spacer PS and the substrate SB1. As a result, the liquid crystal stays on the lower side of the panel by a gravity force, which further increases the gap on the lower side of the panel. This causes a high-temperature gap unevenness.

Figure 17:
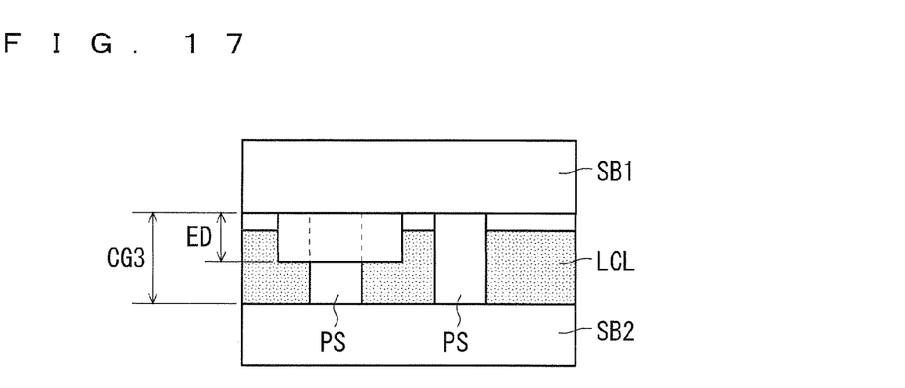

FIG. 17 illustrates the state in which the liquid crystal layer LCL is contracted with the temperature drop of the liquid crystal display device. When the cell gap narrows due to the contraction of the liquid crystal layer LCL, the pillar spacer PS just below the protrusion DP is firstly elastically deformed. Therefore, the height of the pillar spacer PS lowers according to the space obtained by subtracting the height of the protrusion DP from the contracted cell gap CG3. When the other pillar spacer PS is then brought into contact with the substrate SB1, the repelling force to the substrate SB1 increases. When the repelling force of all pillar spacers PS becomes equal to an atmospheric pressure, the pillar spacers are not deformed any more.

On the other hand, when the liquid crystal layer LCL is further contracted, the pressure in the cell of the liquid crystal display device decreases, so that vacuum bubble (low-temperature bubbling) is generated in the cell.

As described above, if the change in the pillar spacer can keep up with the thermal expansion and contraction of the liquid crystal, the occurrence of high-temperature gap unevenness and low-temperature bubbling phenomenon can be prevented.

The inventor has reached a technical idea of adjusting an amount of liquid crystal to optimize a cell gap with respect to a height of a pillar spacer in consideration of the thermal expansion and contraction of the liquid crystal. Preferred embodiments of the present invention based on the technical idea will be described below.

In the description below, a liquid crystal display device according to the present invention is an active matrix liquid crystal display device driven by a TFT (Thin Film Transistor).

First Preferred Embodiment

Configuration of Device

Figure 1:
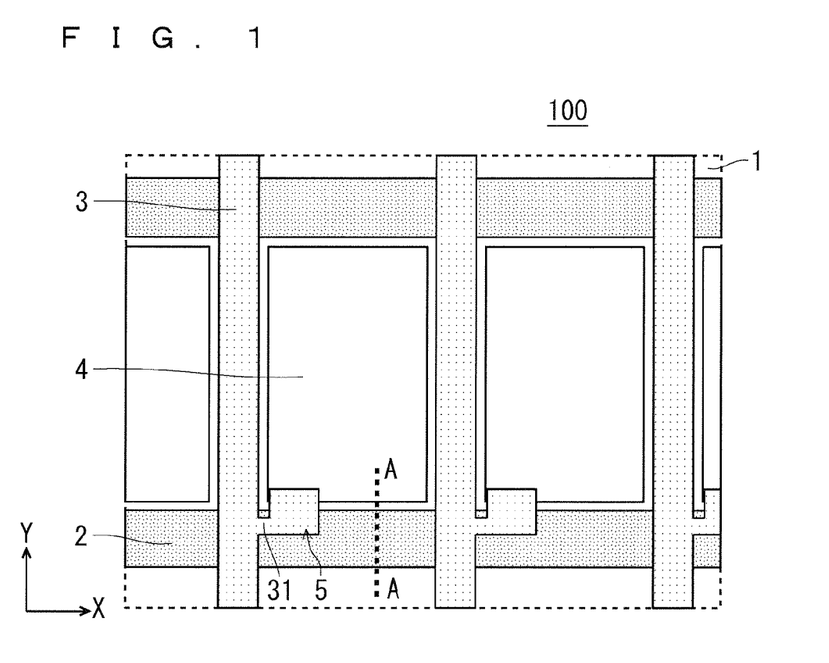
FIG. 1 is a partial plan view illustrating a configuration of a TFT substrate.
Figure 2:
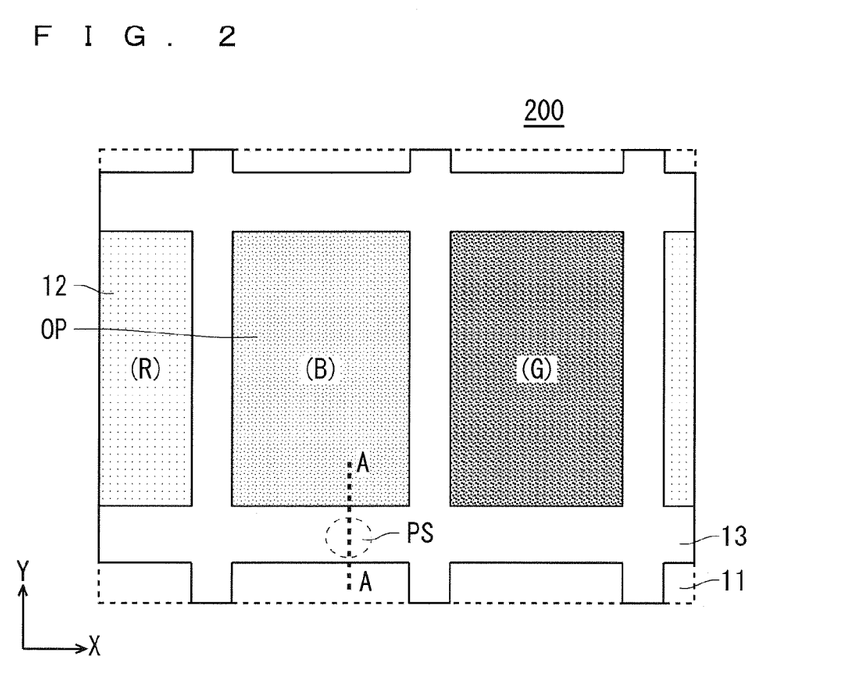
FIG. 2 is a partial plan view illustrating a configuration of a CF substrate.
Figure 3:
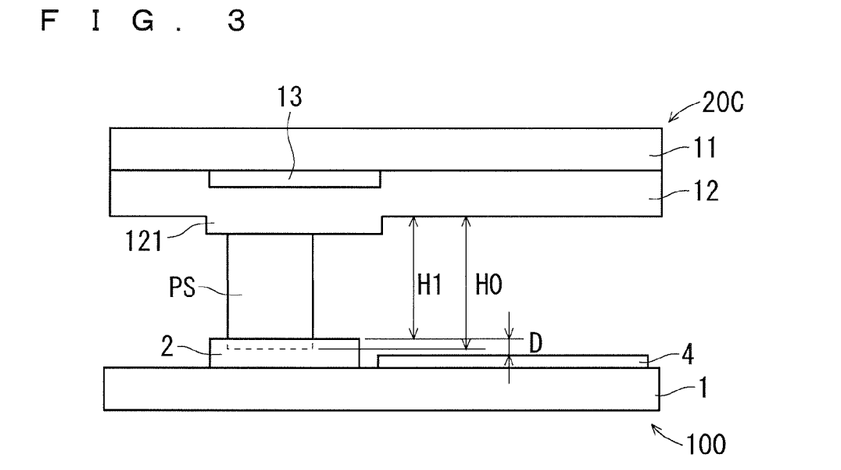
FIG. 3 is a cross-sectional view illustrating a configuration of a liquid crystal panel.

FIGS. 1 and 2 are plan views of a liquid crystal panel of the liquid crystal display device viewed from a counter substrate, wherein FIG. 1 is a plan view illustrating a configuration of a TFT substrate 100, and FIG. 2 is a plan view illustrating a configuration of a color filter (CF) substrate 200 serving as a counter substrate. FIG. 3 is a cross-sectional view taken along a line A-A in FIGS. 1 and 2.

As illustrated in FIG. 1, on the TFT substrate 100, gate lines 2 and source lines 3 are arranged to cross each other in a matrix on a transparent substrate 1, and a thin-film transistor 5 serving as a switching element for driving a liquid crystal panel is arranged on each intersection. A region enclosed by the adjacent gate line 2 and the adjacent source line 3 is a pixel region. On the TFT substrate 100, the pixel regions are arranged in a matrix. A pixel electrode 4 is arranged on each pixel region.

As illustrated in FIG. 2, on the CF substrate 200, color layers 12 of R (red), G (green), and B (blue) are arranged on a glass substrate 11 in a matrix in an X direction and in a Y direction. A black matrix (BM) 13 is arranged between the color layers 12, and a pillar spacer PS is arranged below the BM 13.

As illustrated in FIG. 3, the pillar spacer PS formed on a projection 121 of the color layer 12 below the BM 13 is elastically deformed in contact with the top of the gate line 2, so that the pillar spacer PS is compressed from the initial height H0 by the height of the projection 121. Therefore, the height of the pillar spacer PS becomes H1.

A step height D, which is 0.1 µm, is formed between the top surface of the gate line 2 on which the pillar spacer PS is arranged (the surface with which the pillar spacer is in contact) and a top surface of the pixel electrode 4 that is a reference surface. The reference surface is not limited to the top surface of the pixel electrode 4.

<Manufacturing Flow of Liquid Crystal Display Device>

As a method of manufacturing the liquid crystal display device according to the first preferred embodiment of the present invention, a manufacturing flow of the liquid crystal display device having the liquid crystal panel thus configured will be described with reference to a flowchart in FIG. 4.

In general, one or more liquid crystal panels are cut from a mother substrate larger than a final shape (multiple panel). Processes in steps S1 to S10 in FIG. 4 are processes in the state of the mother substrate.

In step S1, lines are transferred onto a mother TFT substrate and a mother CF substrate. Specifically, a process of forming the gate lines 2, the source lines 3, and the pixel electrodes 4 illustrated in FIG. 1 on the mother TFT substrate is carried out. The formation of these lines and electrodes is the same as in a method of manufacturing a TFT substrate in a general liquid crystal panel. Therefore, the detailed description of the manufacturing method will not be made here.

A process of forming the color layers 12 and BM 13 illustrated in FIG. 2 on the mother CF substrate is carried out. The formation of these is the same as in a method of manufacturing a CF substrate in a general liquid crystal panel. Therefore, the detailed description of the manufacturing method will not be made here.

Next, in a rubbing process in step S2, a material of an alignment film is applied on the main surfaces, which are opposite to each other, of the mother TFT substrate and the mother CF substrate. This process includes a process of applying the material of the alignment film made of an organic material by a printing process, and baking and drying the applied material by use of a hot plate.

Thereafter, the material of the alignment film is rubbed to perform an alignment process on the surface of the material of the alignment film, whereby an alignment film is formed. FIG. 3 does not illustrate the alignment film for the sake of convenience. The pillar spacer PS is formed on the mother CF substrate by using a photosensitive resin before the formation of the alignment film. Therefore, the portion on the pillar spacer PS and the other region are actually covered by the alignment film, and the height of the pillar spacer PS is determined with the surface of the alignment film, not illustrated, being used as a reference.

Next, in step S3, the height of the pillar spacer PS is measured. In the first preferred embodiment, the height of the pillar spacers is supposed to be the same, and in step S3, only the height of one pillar spacer PS is measured. Since the pillar spacer PS is formed on the mother CF substrate, the initial height on the mother CF substrate is only measured. The height may be measured on any timing, so long as it is measured before the liquid crystal is dropped. Because the height of the pillar spacer PS used below is determined with the surface of the alignment film being used as a reference as described above. However, if the height is measured before the formation of the alignment film, the measured height may be converted into the height of the pillar spacer PS with the surface of the alignment film being used as a reference from data of the thickness of the alignment film formed on the pillar spacer PS and the other region.

Next, in a sealing agent application process in step S4, a sealing agent is applied as a print paste onto the main surface of the mother TFT substrate or the mother CF substrate by a dispenser process. The sealing agent is applied to cover a display region of the liquid crystal panel, thereby forming a seal pattern.

Next, in a liquid-crystal dropping process in step S5, liquid crystal is dropped in a region enclosed by the seal pattern on the substrate on which the seal pattern is formed. The amount of the dropped liquid crystal is determined based on the height of the pillar spacer PS measured in step S3.

Next, in a vacuum bonding process in step S6, the mother TFT substrate and the mother CF substrate are bonded in a vacuum to form a mother cell substrate.

Next, in a UV (ultraviolet light) irradiation process in step S7, the mother cell substrate is irradiated with ultraviolet light to temporarily cure the sealing agent.

Then, in step S8, after cure is carried out by application of heat to completely cure the sealing agent. Thus, the cured seal pattern is formed.

Next, in a gap measurement process in step S9, a cell gap (GAP) is measured. Specifically, the cell gap between the centers of cells, enclosed by the seal pattern, of the mother cell substrate formed by bonding the mother TFT substrate and the mother CF substrate with the seal pattern is measured. The cell gap may be measured on the timing after a panel cutting process. However, the cell gap cannot be measured after a polarizing plate is adhered. Therefore, it is necessary to measure the cell gap at least before the polarizing plate is adhered. Specifically, the gap measurement process in step S9 may be executed during the period after the liquid crystal is dropped and injected till the polarizing plate is adhered.

Next, in step S10, OK/NG determination for an individual panel in the mother cell substrate is made based on the measured data of the height of the pillar spacer PS obtained in step S3 and the measured data of the cell gap obtained in step S9.

Specifically, the determination (OK/NG determination) as to whether or not the high-temperature gap unevenness and low-temperature bubbling phenomenon occur on the individual panel in the mother cell substrate is made based on a determination criteria set beforehand (step S101), and the result of the determination is recorded for each panel (step S102). The determination criteria will be described later.

Next, in the panel cutting process in step S11, the mother cell substrate is cut along a scrub line to divide the mother cell substrate into liquid crystal panels.

In step S12, the OK/NG determination obtained in step S10 and the individual liquid crystal panel cut in step S11 are compared. The liquid crystal panel determined to be NG is removed from the manufacturing process (step S15).

On the other hand, the manufacturing process is continued for the liquid crystal panel determined to be OK in step S12. Specifically, a polarizing plate bonding process in step S13 and a control substrate mounting process in step S14 are executed. Thus, a series of the manufacturing process is ended.

<Determination Criteria for OK/NG>

The determination criteria as to whether or not the high-temperature gap unevenness and low-temperature bubbling phenomenon occur in step S10 will be described below.

It is supposed that the design value (GAPm) of the cell gap is 3 nm, and the occupied area ratio of the pillar spacer PS is 1%. The occupied area ratio of the pillar spacer PS is defined as illustrated in FIG. 5.

Figure 5:
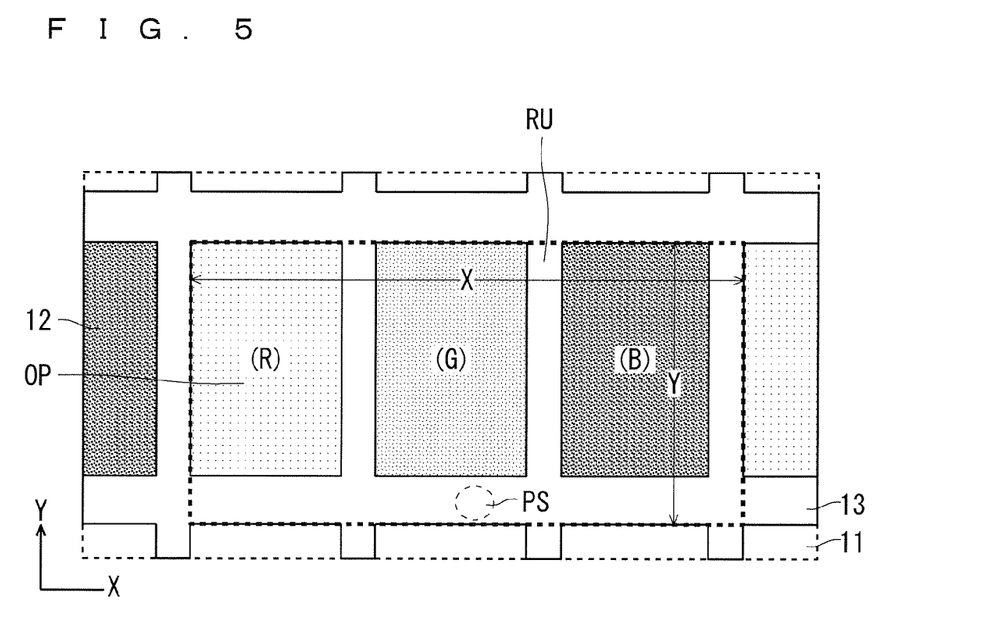
FIG. 5 is a view for describing a definition of an occupied area ratio of the pillar spacer.

As indicated by a broken line in FIG. 5, a region including one short side and one long side of three pixel regions of R, G, and B and the BM 13 enclosing the three pixel regions is referred to as a repetitive unit. The area occupied by the pillar spacer PS in the total area of the repetitive unit RU is defined as the occupied area ratio of the pillar spacer PS.

In FIG. 5, one pillar spacer PS is formed in one repetitive unit RU. Therefore, the occupied area ratio can be represented by a formula described below, when the length of the repetitive unit RU in the X direction is defined as X, the length in the Y direction is defined as Y, and the area of the pillar spacer PS on the end face is defined as S.

Occupied area ratio=$S/(X \times Y) \times 100$[%].

As described with reference to FIG. 3, the step height D between the top surface of the gate line 2 and the top surface of the pixel electrode 4 serving as the reference surface is 0.1 μm.

Under the condition described above, the liquid crystal panel is determined to be the one in which the high-temperature gap unevenness and low-temperature bubbling phenomenon do not occur, when satisfying formulas (1) and (2) described below.

$$PS - GAPm \geq GAPc \times a \times \Delta Th - D \quad (1)$$

$$PS - GAPm \leq 9.8/(k \times c) - \Delta Tl \times a \times GAPc - D \quad (2)$$

"PS" indicates the measured height [m] of the pillar spacer PS, "GAPm" indicates the measured cell gap [m], "GAPc" indicates the design value [m] of the cell gap, "D" indicates the step [m] between the top surface of the gate line 2 and the top surface of the pixel electrode 4 serving as the reference surface, "a" indicates a thermal expansion coefficient [1/K] of the liquid crystal, "k" indicates a spring constant [N/m] of the pillar spacer, and "c" indicates the density [number/cm$^2$] of the pillar spacer.

When an operational temperature at high temperature side is defined as TH[° C.], and an operational temperature at low temperature side is defined as TL[° C.], the difference between room temperature (20° C.) during the manufacture and TH and the difference between the room temperature and TL are respectively represented by $\Delta Th=TH-20$, $\Delta Tl=20-TL$.

The process of deriving the formulas (1) and (2) will be described below. The deformation amount $\Delta GAP$ of the pillar spacer from the initial value is defined by a formula (3) described below.

$$\Delta GAP = PS + D - GAPm \quad (3)$$

In order to prevent the occurrence of the high-temperature gap unevenness, a conditional formula (4) described below may be satisfied.

$$\Delta GAP \geq GAPc \times a \times \Delta Th \quad (4)$$

The formula (1) can be derived by substituting the formula (3) into the formula (4).

On the other hand, a conditional formula (5) may be satisfied in order to prevent the occurrence of the low-temperature bubbling phenomenon.

$$1 \text{ [kg/cm}^2\text{]} \geq (\Delta GAP + \Delta Tl \times a \times GAPc) \times (k/9.8) \times c \quad (5)$$

In the formula (5), $\Delta Tl \times a \times GAPc$ indicates the change in the cell gap due to the thermal contraction of the liquid crystal, and $(\Delta GAP + \Delta Tl \times a \times GAPc) \times k$ indicates a repelling force of one pillar spacer.

The unit of the spring constant k is converted into MKS unit [kg/m] from [N/m] by k/9.8.

$(\Delta GAP + \Delta Tl \times a \times GAPc) \times (k/9.8) \times c$ indicates a repelling force per 1 cm$^2$. The formula (5) represents that, when this repelling force is larger than atmospheric pressure 1 kg/cm$^2$, the low-temperature bubbling phenomenon occurs.

A formula (6) described below is obtained from the formula (5).

$$\Delta GAP \leq 9.8/(k \times c) - \Delta Tl \times a \times GAPc \quad (6)$$

The formula (2) can be derived by substituting the formula (3) into the formula (6).

By using the determination criteria described above, whether or not the high-temperature gap unevenness and low-temperature bubbling phenomenon occur on the liquid crystal display device in which the pillar spacers have the same height can be determined, and the liquid crystal display device free from the high-temperature gap unevenness and low-temperature bubbling phenomenon can be manufactured with high yield. Accordingly, the liquid crystal display device having satisfactory display characteristic and excellent reliability can be obtained.

It becomes unnecessary to confirm whether or not the high-temperature gap unevenness and low-temperature bubbling phenomenon occur as a result of high-temperature and low-temperature tests to all of the actually manufactured liquid crystal display devices. Accordingly, the work period for the manufacture can be shortened, and cost can be reduced.

<Consideration of Thermal Expansion of Pillar Spacer>

The formulas (1) and (2) do not consider the thermal expansion of the pillar spacer PS. However, considering the thermal expansion, the formulas (1) and (2) can be represented by formulas (7) and (8) respectively.

$$PS - GAPm \geq GAPc \times a \times \Delta Th - D \quad (7)$$

$$PS - GAPm \leq 9.8/(k \times c) - \Delta Tl \times a \times GAPc - D \quad (8)$$

Here, "a" indicates the difference (a–b) between the thermal expansion coefficient "a" of the liquid crystal and the thermal expansion coefficient "b" of the pillar spacer PS.

By using the determination criteria described above, the quality of the liquid crystal panel can be determined in consideration of the thermal expansion coefficient of the pillar spacer.

Second Preferred Embodiment

In the method of manufacturing a liquid crystal display device according to the first preferred embodiment described above, the determination criteria as to whether or not the high-temperature gap unevenness and low-temperature bubbling phenomenon occur in the liquid crystal display device in which the pillar spacers have the same height has been described. In the second preferred embodiment, the determination criteria for a liquid crystal display device in which two types of pillar spacers each having a different height are used.

The second preferred embodiment can employ the manufacturing flow for the liquid crystal display device described with reference to FIG. 4, and only the determination criteria as to whether or not the high-temperature gap unevenness and low-temperature bubbling phenomenon occur in step S10 is different.

It is supposed that the pillar spacer includes a main pillar spacer, and a sub pillar spacer having an initial height smaller than that of the main pillar spacer. It is also supposed that the occupied area ratio of the main pillar spacer is 0.1%, and the occupied area ratio of the sub pillar spacer is 3%. The design value (GAPm) of the cell gap is supposed to be 3 μm.

The main pillar spacer is used to always hold the gap between the substrates, while the sub pillar spacer is used to hold the gap between the substrates only when the gap between the substrates narrows due to external force. Therefore, like the pillar spacer PS described with reference to FIG. 3, the main pillar spacer is generally in contact with the top surface of the gate line 2, but the sub pillar spacer is in contact with nowhere on the TFT substrate 200.

As described with reference to FIG. 3, the step height D between the top surface of the gate line 2 and the top surface of the pixel electrode 4 serving as the reference surface is 0.1 μm.

Under the condition described above, the liquid crystal panel is determined to be the one in which the high-temperature gap unevenness and low-temperature bubbling phenomenon do not occur, when satisfying formulas (9) and (10) described below.

$$MPS - GAPm \geq GAPc \times a \times \Delta Th - D \quad (9)$$

$$GAPm - SPS \geq GAPc \times a \times \Delta Tl + D \quad (10)$$

"MPS" indicates the measured height [m] of the main pillar spacer, "SPS" indicates the measured height [m] of the sub pillar spacer, "GAPm" indicates the measured cell gap [m], "GAPc" indicates the design value [m] of the cell gap, "D" indicates the step [m] between the top surface of the gate line 2 and the top surface of the pixel electrode 4 serving as the reference surface, and "a" indicates a thermal expansion coefficient [1/K] of the liquid crystal.

When an operational temperature at high temperature side is defined as TH[° C.], and an operational temperature at low temperature side is defined as TL[° C.], the difference between room temperature (20° C.) during the manufacture and TH and the difference between the room temperature and TL are respectively represented by $\Delta Th=TH-20$, $\Delta Tl=20-TL$.

The process of deriving the formulas (9) and (10) will be described below. The deformation amount $\Delta MGAP$ of the main pillar spacer from the initial value is defined by a formula (11) described below.

$$\Delta MGAP = MPS + D - GAPm \quad (11)$$

In order to prevent the occurrence of the high-temperature gap unevenness, a conditional formula (12) described below may be satisfied.

$$\Delta MGAP \geq GAPc \times a \times \Delta Th \quad (12)$$

The formula (9) can be derived by substituting the formula (11) into the formula (12).

The deformation amount $\Delta SGAP$ of the sub pillar spacer from the initial value is defined by a formula (13) described below.

$$\Delta SGAP = GAPm - SPS - D \quad (13)$$

A conditional formula (14) may be satisfied in order to prevent the occurrence of the low-temperature bubbling phenomenon.

$$\Delta SGAP \geq GAPc \times a \times \Delta Tl \quad (14)$$

The formula (10) can be derived by substituting the formula (13) into the formula (14).

When the thermal expansion coefficient "a" of the liquid crystal is defined as $6.5 \times 10^{-4}$ (1/K), and the operational temperature range Tl to TH is defined as $-40$ degrees to $+80$ degrees, the occurrence of the high-temperature gap unevenness can be prevented from the formula (9) if the difference between the measured height (MPS) of the main pillar spacer and the measured cell gap (GAPm) is not less than $3 \times (6.5 \times 10^{-4}) \times (80-20) - 0.1 = 0.017$ μm.

From the formula (10), the occurrence of the low-temperature bubbling phenomenon can be prevented if the difference between the measured height (SPS) of the sub pillar spacer and the measured cell gap (GAPm) is not less than $3 \times (6.5 \times 10^{-4}) \times (20-(-40)) + 0.1 = 0.217$ μm.

Whether or not the high-temperature gap unevenness and low-temperature bubbling phenomenon occur on the liquid crystal display device in which the pillar spacers have the different height can be determined by the determination of the quality of the liquid crystal panel based on the determination criteria described above, and the liquid crystal display device free from the high-temperature gap unevenness and low-temperature bubbling phenomenon can be manufactured with high yield. Accordingly, the liquid crystal display device having satisfactory display characteristic and excellent reliability can be obtained.

It becomes unnecessary to confirm whether or not the high-temperature gap unevenness and low-temperature bubbling phenomenon occur as a result of high-temperature and low-temperature tests to all of the actually manufactured liquid crystal display devices. Accordingly, the work period for the manufacture can be shortened, and cost can be reduced.

<Consideration of Thermal Expansion of Pillar Spacer>

The formulas (9) and (10) do not consider the thermal expansion of the main pillar spacer and the sup pillar spacer. However, considering the thermal expansion, the formulas (9) and (10) can be represented by formulas (15) and (16) respectively.

$$MPS - GAPm \geq GAPc \times a \times \Delta Th - D \quad (15)$$

$$GAPm - SPS \geq GAPc \times a \times \Delta Tl + D \quad (16)$$

By using the determination criteria described above, the quality of the liquid crystal panel can be determined in consideration of the thermal expansion coefficient of the pillar spacer.

Here, "$\alpha$" indicates the difference (a−b) between the thermal expansion coefficient "a" of the liquid crystal and the thermal expansion coefficient "b" of the pillar spacers MPS and SPS. The thermal expansion coefficient "a" of the liquid crystal is defined as $6.5 \times 10^{-4}$ (1/K), and the thermal expansion coefficient "b" of the pillar spacers MPS and SPS is defined as $0.5 \times 10^{-4}$ (1/K). In addition, when the operational temperature range Tl to TH is defined as $-40$ degrees to $+80$ degrees, the occurrence of the high-temperature gap unevenness can be prevented from the formula (15) if the difference between the measured height (MPS) of the main pillar spacer and the measured cell gap (GAPm) is not less than $3 \times ((6.5 \times 10^{-4}) - (0.5 \times 10^{-4})) \times (80-20) - 0.1 = 0.008$ μm.

From the formula (16), the occurrence of the low-temperature bubbling phenomenon can be prevented if the difference between the measured height (SPS) of the sub pillar spacer and the measured cell gap (GAPm) is not less than $3 \times ((6.5 \times 10^{-4}) - (0.5 \times 10^{-4})) \times (20-(-40)) + 0.1 = 0.208$ μm.

Third Preferred Embodiment

In a method of manufacturing a liquid crystal display device according to a third preferred embodiment, in a liquid crystal display device provided with pillar spacers having the same height, a pillar spacer PS is provided on the CF substrate 200, and a protrusion with a height of 0.5 μm is formed on the position of the TFT substrate 100 opposite to the pillar spacer PS. A determination criteria as to whether or not the high-temperature gap unevenness and low-temperature bubbling phenomenon occur in the liquid crystal display device will be described.

Figure 6:
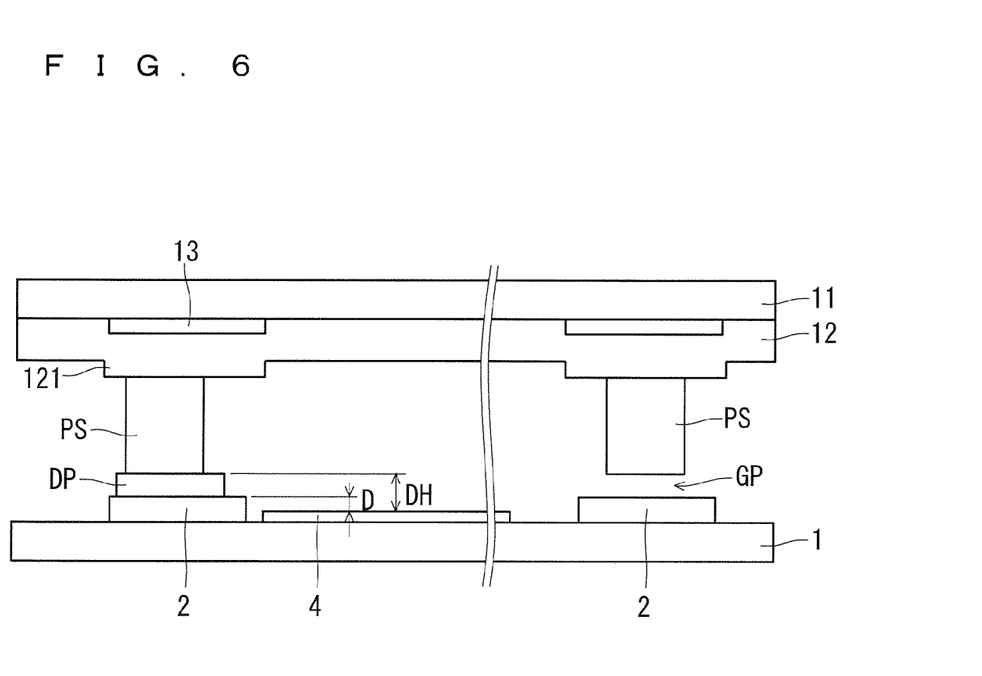
FIG. 6 is a cross-sectional view illustrating a configuration of a liquid crystal display device having a protrusion.

FIG. 6 is a cross-sectional view illustrating the liquid crystal display device provided with the protrusion. As illustrated in FIG. 6, the pillar spacer PS is provided on the projection 121 of the color layer 12 below the BM 13, and is in contact with a protrusion DP formed on the top of the opposing gate line 2. A step height DH between the top surface of the protrusion DP and the top surface of the pixel electrode 4 serving as a reference surface is supposed to be 0.5 μm.

The step height D between the top surface of the gate line 2 and the top surface of the pixel electrode 4 serving as the reference surface is 0.1 μm.

The protrusion DP is not provided to all pillar spacers PS. Therefore, as illustrated in FIG. 6, a gap GP is formed between the end face of the pillar spacer PS and the gate line 2 on the portion where the protrusion DP is not formed.

Figure 7:
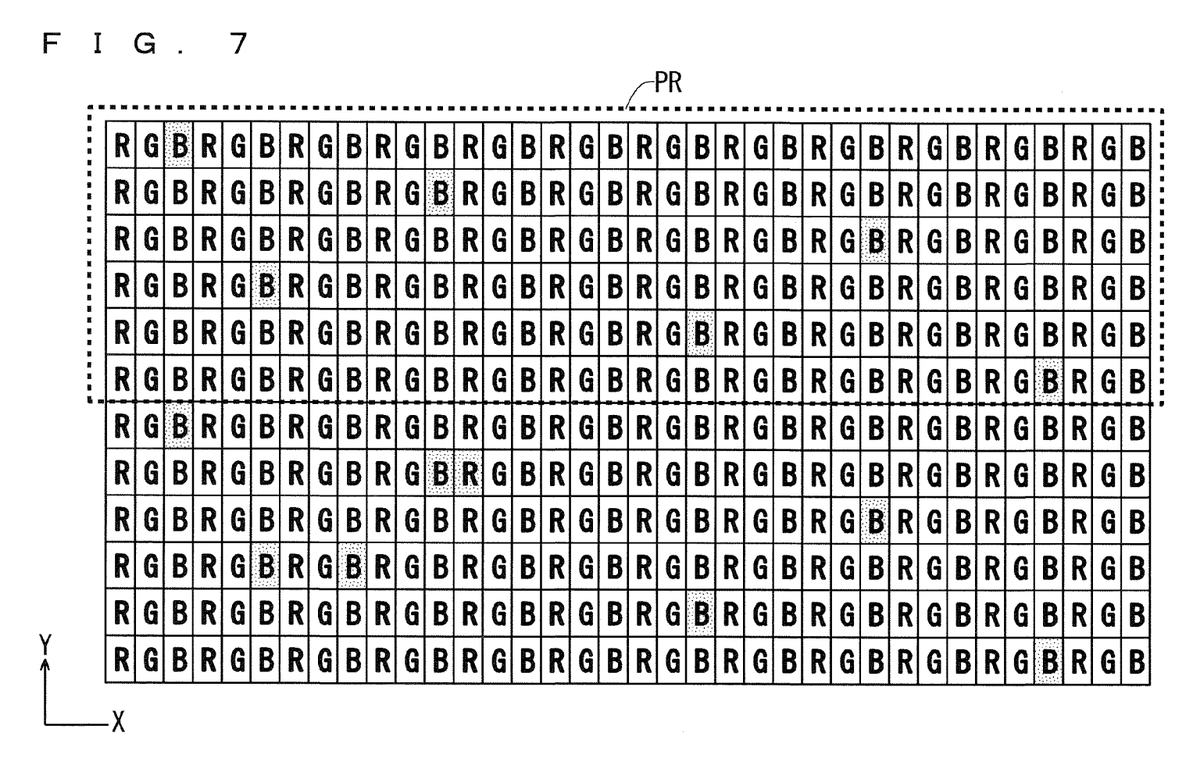
FIG. 7 is a view illustrating one example of an arrangement of the protrusion.

The protrusion DP is formed to one out of twelve pillar spacers PS. FIG. 7 illustrates one example.

FIG. 7 is a plan view illustrating an arrangement of pixels in the liquid crystal panel. When one pixel is formed by sub-pixels of R, G, and B, the protrusion DP is formed on only six pixels in a region PR having twelve pixels in the X direction and six pixels in the Y direction. In FIG. 7, the pillar spacer PS is formed on the sub-pixel of B, and the one provided with the protrusion DP is hatched.

The third preferred embodiment can employ the manufacturing flow for the liquid crystal display device described with reference to FIG. 4, and only the determination criteria as to whether or not the high-temperature gap unevenness and low-temperature bubbling phenomenon occur in step S10 is different.

It is supposed that the design value (GAPm) of the cell gap is 3 μm, and the occupied area ratio of the pillar spacer PS is 1%.

Under the condition described above, the liquid crystal panel is determined to be the one in which the high-temperature gap unevenness and low-temperature bubbling phenomenon do not occur, when satisfying formulas (17) and (18) described below.

$$PS-GAPm \geq GAPc \times a \times \Delta Th - DH \quad (17)$$

$$GAPm - PS \geq GAPc \times a \times \Delta Tl + D \quad (18)$$

Here, "PS" indicates the measured height [m] of the pillar spacer PS, "GAPm" indicates the measured cell gap [m], "GAPc" indicates the design value [m] of the cell gap, "DH" indicates the step [m] between the top surface of the protrusion DP and the top surface of the pixel electrode 4 serving as the reference surface, "D" indicates the step [m] between the top surface of the gate line 2 and the top surface of the pixel electrode 4 serving as the reference surface, and "a" indicates a thermal expansion coefficient [1/K] of the liquid crystal.

When an operational temperature at high temperature side is defined as TH[° C.], and an operational temperature at low temperature side is defined as TL[° C.], the difference between room temperature (20° C.) during the manufacture and TH and the difference between the room temperature and TL are respectively represented by $\Delta Th = TH-20$, $\Delta Tl = 20-TL$.

The process of deriving the formulas (17) and (18) will be described below. The deformation amount ΔGAPH of the pillar spacer PS, which is in contact with the protrusion DP, from the initial value is defined by a formula (19) described below.

$$\Delta GAPH = PS + DH - GAPm \quad (19)$$

In order to prevent the occurrence of the high-temperature gap unevenness, a conditional formula (20) described below may be satisfied.

$$\Delta GAPH \geq GAPc \times a \times \Delta Th \quad (20)$$

The formula (17) can be derived by substituting the formula (19) into the formula (20).

The deformation amount ΔGAPJ of the pillar spacer PS, which is not in contact with the protrusion DP, from the initial value is defined by a formula (21) described below.

$$\Delta GAPJ = GAPm - PS - D \quad (21)$$

A conditional formula (22) may be satisfied in order to prevent the occurrence of the low-temperature bubbling phenomenon.

$$\Delta GAPJ \geq GAPc \times a \times \Delta Tl \quad (22)$$

The formula (18) can be derived by substituting the formula (21) into the formula (22).

When the thermal expansion coefficient "a" of the liquid crystal is defined as $6.5 \times 10^{-4}$(1/K), and the operational temperature range Tl to TH is defined as −40 degrees to +80 degrees, the occurrence of the high-temperature gap unevenness can be prevented from the formula (17) if the difference between the measured height (PS) of the pillar spacer and the measured cell gap (GAPm) is not less than $3 \times (6.5 \times 10^{-4}) \times (80-20) - 0.5 = -0.383$ μm.

From the formula (18), the occurrence of the low-temperature bubbling phenomenon can be prevented if the difference between the measured height (PS) of the sub pillar spacer and the measured cell gap (GAPm) is not less than $3 \times (6.5 \times 10^{-4}) \times (20 - (-40)) + 0.1 = 0.217$ μm.

Whether or not the high-temperature gap unevenness and low-temperature bubbling phenomenon occur on the liquid crystal display device having a function same as a device in which the protrusion is formed on the portion facing the pillar spacer, and the pillar spacers have the different height can be determined by the determination of the quality of the liquid crystal panel based on the determination criteria described above, and the liquid crystal display device free from the high-temperature gap unevenness and low-temperature bubbling phenomenon can be manufactured with high yield. Accordingly, the liquid crystal display device having satisfactory display characteristic and excellent reliability can be obtained.

It becomes unnecessary to confirm whether or not the high-temperature gap unevenness and low-temperature bubbling phenomenon occur as a result of high-temperature and low-temperature tests to all of the actually manufactured liquid crystal display devices. Accordingly, the work period for the manufacture can be shortened, and cost can be reduced.

<Consideration of Thermal Expansion of Pillar Spacer>

The formulas (17) and (18) do not consider the thermal expansion of the pillar spacer PS. However, considering the thermal expansion, the formulas (17) and (18) can be represented by formulas (23) and (24) respectively.

$$PS - GAPm \geq GAPc \times \alpha \times \Delta Th - DH \quad (23)$$

$$GAPm - PS \geq GAPc \times \alpha \times \Delta Tl + D \quad (24)$$

Here, "α" indicates the difference (a−b) between the thermal expansion coefficient "a" of the liquid crystal and the thermal expansion coefficient "b" of the pillar spacer PS.

By using the determination criteria described above, the quality of the liquid crystal panel can be determined in consideration of the thermal expansion coefficient of the pillar spacer.

<Verification of Determination Criteria>

The first to third preferred embodiments described above have described the determination criteria for determining the possibility of the occurrence of the high-temperature gap unevenness and low-temperature bubbling phenomenon. A test described below was carried out for confirming the validity of the determination criteria.

Figure 8:
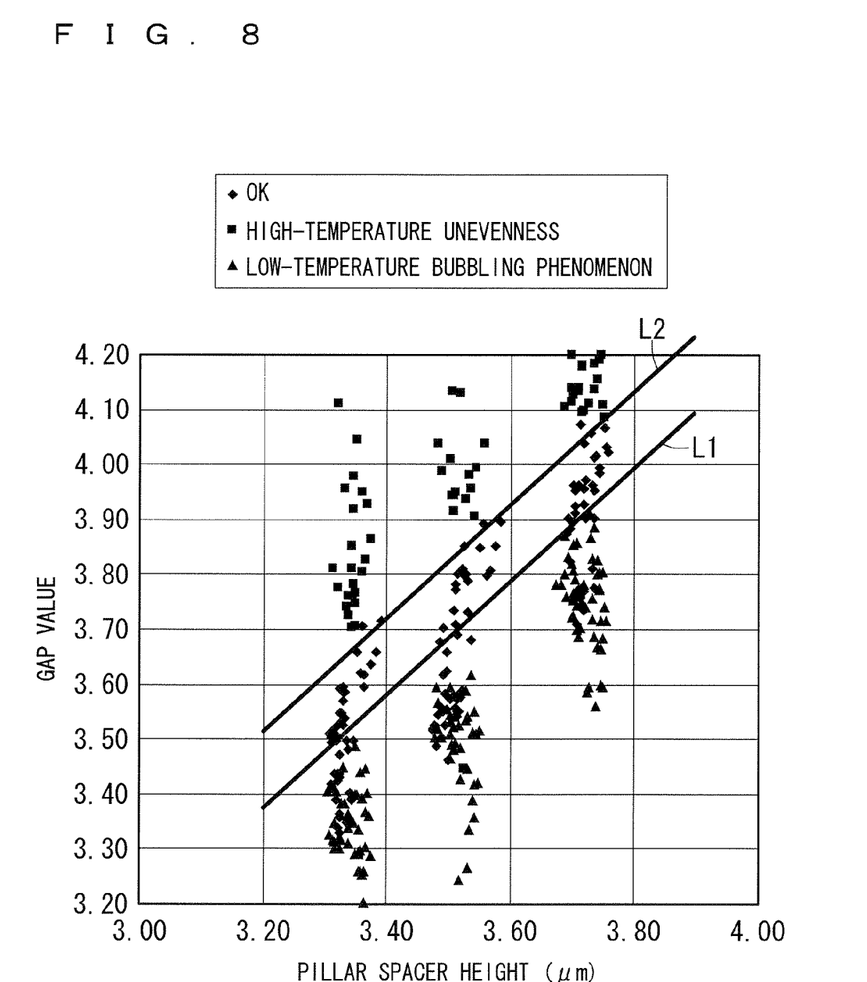
FIG. 8 is a view illustrating a result of a measurement as to whether high-temperature gap unevenness and low-temperature bubbling phenomenon occurs in a liquid crystal display device having pillar spacers with the same height.

Specifically, FIG. 8 illustrates a result of an experiment as to whether or not the high-temperature gap unevenness and low-temperature bubbling phenomenon occur in a liquid crystal display device having pillar spacers with the same height. In this experiment, the measured height (PS) of the pillar spacer and the measured cell gap (GAPm) were used as parameters.

As the condition for the experiment, the thermal expansion coefficient of the liquid crystal was set as $6.5 \times 10^{-4}$ (1/K), the operational temperature range Tl to TH was set as −40 degrees to +80 degrees, and the occupied area ratio of the pillar spacer was 0.1%.

In FIG. 8, the horizontal axis indicates the height (μm) of the pillar spacer, and the vertical axis indicates the cell gap (μm). The conditions by which the high-temperature gap unevenness occurs are plotted with a rectangular mark, the conditions by which the low-temperature bubbling phenomenon occurs are plotted by a triangular mark, and the conditions (OK conditions) by which neither the high-temperature gap unevenness nor the low-temperature bubbling phenomenon occurs are plotted by a diamond mark. It is understood from FIG. 8 that the OK conditions are concentrated on the region satisfying a formula (25) described below.

$$0.32 \geq GAPm - PS \geq 0.2 \quad (25)$$

The straight line indicated by GAPm=0.2+PS is the straight line L1 in FIG. 8, while the straight line indicated by GAPm=PS+0.32 is the straight line L2 in FIG. 8.

When the height of the pillar spacer and the cell gap satisfy the formula (25), neither the high-temperature gap unevenness nor the low-temperature bubbling phenomenon occurs. Accordingly, the determination criteria described in first to third preferred embodiments can be valid.

<Automation of Manufacturing System>

Figure 4:
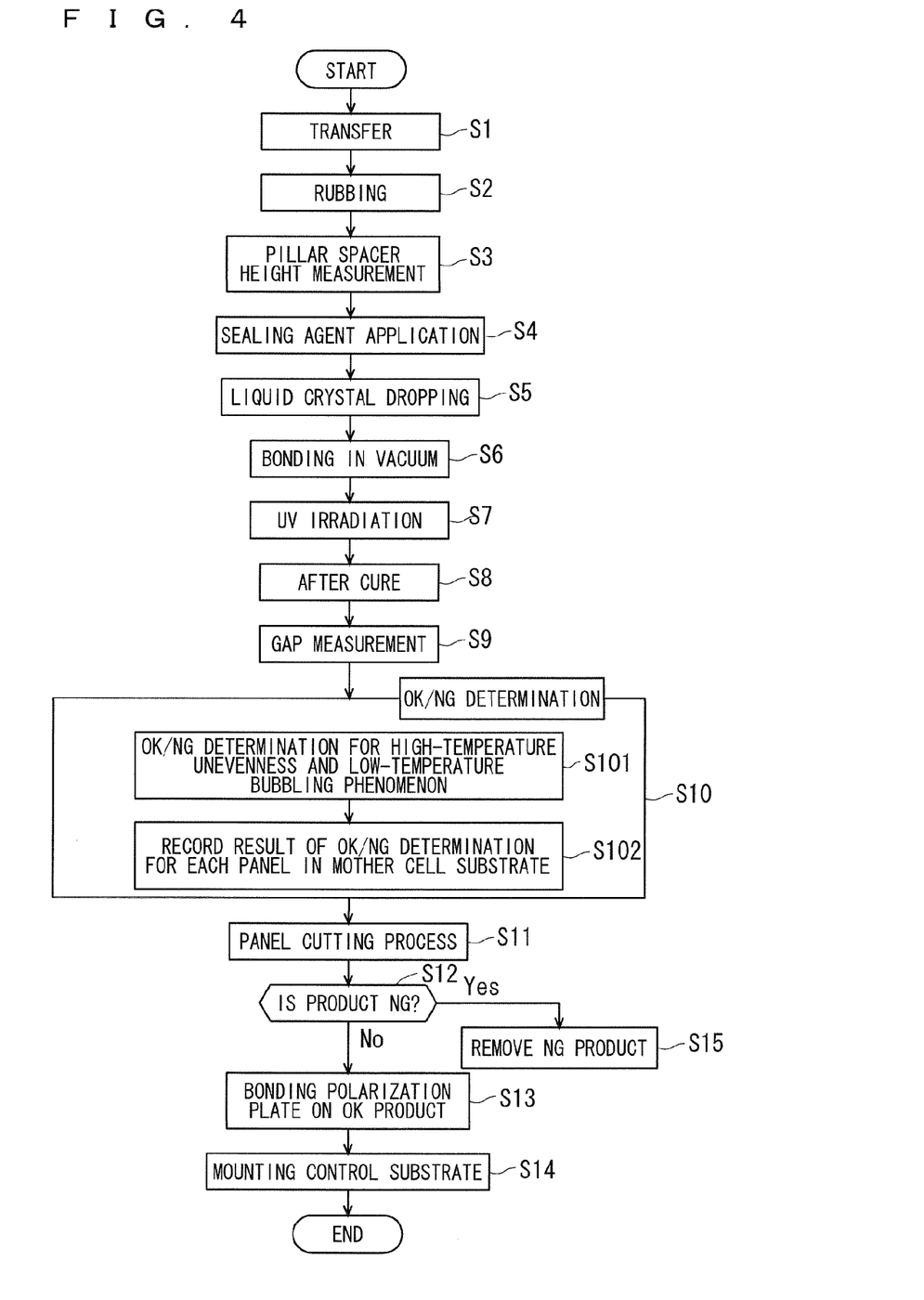
FIG. 4 is a flowchart describing a method of manufacturing a liquid crystal display device according to the present invention.

The manufacturing flow of the liquid crystal display device described with reference to FIG. 4 is preferably automated by connecting individual processing device with a conveyer. For the automation, a height measuring device measuring the height of the pillar spacer PS (step S3), a gap measuring device measuring the cell gap (step S9), and a computer system (quality determination system), such as a personal computer, making the OK/NG determination (step S10) are connected with a communication path in order that data of the measurement result is received and transmitted among the devices.

The computer system and a sorting device that automatically performs a sorting process (step S12) of sorting an NG product (the liquid crystal panel determined to be NG) are connected with the communication path in order that the data of the determination result is received and transmitted. With this configuration, the manufacturing flow of the liquid crystal display device can entirely be automated and systematized.

As a result, a manufacturing system that can quickly perform the manufacturing flow by which a liquid crystal display device having satisfactory display characteristic and excellent reliability can be obtained can be constructed.

Each of the preferred embodiments according to the present invention can freely be combined, and can be modified or skipped, according to need, without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a liquid crystal display device having a liquid crystal panel that displays a video image, said liquid crystal panel including:
   first and second substrates arranged to be opposite to each other;
   a pillar spacer arranged on a main surface of said first substrate opposite to said second substrate, the pillar spacer holding a gap between said first substrate and said second substrate; and
   liquid crystal held between said first and second substrates,
   a manufacturing method of said liquid crystal panel includes the steps of:
   (a) measuring a height of said pillar spacer after said pillar spacer is formed on said main surface of said first substrate;
   (b) measuring the gap between said first and second substrates after said first and second substrates are bonded to each other; and
   (c) determining a quality of said liquid crystal panel based on a difference between the measured height of said pillar spacer and said measured gap.

2. The method of manufacturing a liquid crystal display device according to claim 1, wherein
   said liquid crystal panel is determined to be good when satisfying formulas (1) and (2) in said step (c):

$$PS-GAPm \geq GAPc \times a \times \Delta Th - D \quad (1)$$

$$PS-GAPm \leq 9.8/(k \times c) - \Delta Tl \times a \times GAPc - D \quad (2)$$

where the measured height of said pillar spacer is defined as PS,
said measured gap is defined as GAPm,
a design value of said gap is defined as GAPc,
the height of said second substrate, with which said pillar spacer is in contact, from a reference surface of said second substrate is defined as D,
a thermal expansion coefficient of said liquid crystal is defined as a,
a spring constant of said pillar spacer is defined as k,
an arrangement density of said pillar spacer is defined as c,
a difference between an operational temperature at high temperature side of said liquid crystal panel and room temperature is defined as $\Delta Th$, and
a difference between an operational temperature at low temperature side of said liquid crystal panel and room temperature is defined as $\Delta Tl$.

3. The method of manufacturing a liquid crystal display device according to claim 2, wherein
   said liquid crystal panel is determined to be good when satisfying formulas (3) and (4), instead of said formulas (1) and (2), in said step (c):

$$PS-GAPm \geq GAPc \times a \times \Delta Th - D \quad (3)$$

$$PS-GAPm \leq 9.8/(k \times c) - \Delta Tl \times a \times GAPc - D \quad (4)$$

where a difference between the thermal expansion coefficient of said liquid crystal and the thermal expansion coefficient of said pillar spacer is defined as α.

4. The method of manufacturing a liquid crystal display device according to claim 1, wherein
   said pillar spacer includes a first pillar spacer and a second pillar spacer lower than said first pillar spacer, and
   said liquid crystal panel is determined to be good when satisfying formulas (5) and (6) in said step (c):

$$MPS-GAPm \geq GAPc \times a \times \Delta Th - D \quad (5)$$

$$GAPm-SPS \geq GAPc \times a \times \Delta Tl + D \quad (6)$$

where the measured height of said first pillar spacer is defined as MPS,
the measured height of said second pillar spacer is defined as SPS,
said measured gap is defined as GAPm,
a design value of said gap is defined as GAPc,
the height of said second substrate, with which said first pillar spacer is in contact, from a reference surface of said second substrate is defined as D,
a thermal expansion coefficient of said liquid crystal is defined as a,
a difference between an operational temperature at high temperature side of said liquid crystal panel and room temperature is defined as $\Delta Th$, and
a difference between an operational temperature at low temperature side of said liquid crystal panel and room temperature is defined as $\Delta Tl$.

5. The method of manufacturing a liquid crystal display device according to claim 4, wherein
   said liquid crystal panel is determined to be good when satisfying formulas (7) and (8), instead of said formulas (5) and (6), in said step (c):

$$MPS-GAPm \geq GAPc \times a \times \Delta Th - D \quad (7)$$

$$GAPm-SPS \geq GAPc \times a \times \Delta Tl + D \quad (8)$$

where a difference between the thermal expansion coefficient of said liquid crystal and the thermal expansion coefficient of said pillar spacer is defined as α.

6. The method of manufacturing a liquid crystal display device according to claim 1, wherein said pillar spacer is arranged on said first substrate in plural numbers, said second substrate is provided with a protrusion formed on a part of plural portions facing said pillar spacers, said protrusion being higher than the other plural portions from the reference surface of said second substrate, and said liquid crystal panel is determined to be good when satisfying formulas (9) and (10), in said step (c):

$$PS-GAPm \geq GAPc \times a \times \Delta Th - DH \qquad (9)$$

$$GAPm - PS \geq GAPc \times a \times \Delta Tl + D \qquad (10)$$

where the measured height of said pillar spacer is defined as PS, said measured gap is defined as GAPm, a design value of said gap is defined as GAPc, the height of said protrusion from said reference surface is defined as DH, a height of the portion, facing said pillar spacers, from said reference surface other than said protrusion is defined as D, a thermal expansion coefficient of said liquid crystal is defined as a, a difference between an operational temperature at high temperature side of said liquid crystal panel and room temperature is defined as ΔTh, and a difference between an operational temperature at low temperature side of said liquid crystal panel and room temperature is defined as ΔTl.

7. The method of manufacturing a liquid crystal display device according to claim 6, wherein said liquid crystal panel is determined to be good when satisfying formulas (11) and (12), instead of said formulas (9) and (10), in said step (c):

$$PS-GAPm \geq GAPc \times \alpha \times \Delta Th - DH \qquad (11)$$

$$GAPm - PS \geq GAPc \times \alpha \times \Delta Tl + D \qquad (12)$$

where a difference between the thermal expansion coefficient of said liquid crystal and the thermal expansion coefficient of said pillar spacer is defined as α.

8. A system of manufacturing a liquid crystal display device provided with a liquid crystal panel that displays a video image, said liquid crystal panel including:

first and second substrates arranged to be opposite to each other;

a pillar spacer arranged on a main surface of said first substrate opposite to said second substrate, the pillar spacer holding a gap between said first substrate and said second substrate; and liquid crystal held between said first and second substrates, said system of manufacturing said liquid crystal display device comprising:

a pillar spacer height measuring device that measures a height of said pillar spacer formed on said main surface of said first substrate;

a gap measuring device that measures the gap between said first and second substrates after said first and second substrates are bonded to each other; and a quality determining system that determines a quality of said liquid crystal panel based on a difference between the height of said pillar spacer measured by said pillar spacer height measuring device and said gap measured by said gap measuring device.

9. The system of manufacturing a liquid crystal display device according to claim 8, wherein said quality determining system determines the quality of said liquid crystal panel based on said step (c) in the method of manufacturing a liquid crystal display device according to claim 2.

10. The system of manufacturing a liquid crystal display device according to claim 8, wherein said quality determining system determines the quality of said liquid crystal panel based on said step (c) in the method of manufacturing a liquid crystal display device according to claim 4.

11. The system of manufacturing a liquid crystal display device according to claim 8, wherein said quality determining system determines the quality of said liquid crystal panel based on said step (c) in the method of manufacturing a liquid crystal display device according to claim 6.

* * * * *